United States Patent
de Sousa

(10) Patent No.: US 8,483,092 B2
(45) Date of Patent: Jul. 9, 2013

(54) AUTONOMOUS INFRASTRUCTURE WIRELESS NETWORKS

(76) Inventor: Elvino Silveira Medina de Sousa, Toronto (CA)

(*) Notice: Subject to any disclaimer, the term of this patent is extended or adjusted under 35 U.S.C. 154(b) by 599 days.

(21) Appl. No.: 11/570,005

(22) PCT Filed: Jun. 3, 2005

(86) PCT No.: PCT/CA2005/000868
§ 371 (c)(1),
(2), (4) Date: Aug. 1, 2008

(87) PCT Pub. No.: WO2005/120101
PCT Pub. Date: Dec. 15, 2005

(65) Prior Publication Data
US 2008/0298275 A1    Dec. 4, 2008

Related U.S. Application Data

(60) Provisional application No. 60/576,581, filed on Jun. 4, 2004.

(51) Int. Cl.
*H04L 12/28* (2006.01)
(52) U.S. Cl.
USPC ............................................. 370/255
(58) Field of Classification Search
None
See application file for complete search history.

(56) References Cited

U.S. PATENT DOCUMENTS

| | | | | |
|---|---|---|---|---|
| 6,317,453 | B1* | 11/2001 | Chang | 375/140 |
| 2004/0022258 | A1* | 2/2004 | Tsukada et al. | 370/401 |
| 2004/0047312 | A1* | 3/2004 | Muszynski et al. | 370/331 |
| 2004/0082335 | A1* | 4/2004 | Hirayama et al. | 455/450 |
| 2005/0068915 | A1* | 3/2005 | Atad et al. | 370/316 |
| 2005/0130662 | A1* | 6/2005 | Murai | 455/444 |
| 2006/0098593 | A1* | 5/2006 | Edvardsen et al. | 370/328 |

* cited by examiner

Primary Examiner — Minh-Trang Nguyen

(57) ABSTRACT

A method for deploying a cellular wireless communication network is provided. The method consists of: providing one or more micro base stations; autonomously deploying the micro base stations using a network access point linked to a cellular wireless communication network; and enabling configuration of the micro base stations to execute network operation commands from a network controller associated with the wireless communication network. Another aspect consists of enabling cooperation and network connectivity between micro base stations and other base stations, including micro base stations and large network base stations. Network connectivity to one or more cellular communication terminals associated with individuals or businesses subscribing to the cellular wireless communication network is enabled. A wireless network is also provided which is configurable to link a cellular wireless network through a high data transmission connection so as to define at least one access point between the micro base station and the wireless network. The network includes a wireless interface and receives operation commands from a network controller for configuration of micro base stations, to support the linking of cellular wireless terminals to the wireless network via the wireless interface by operation of the micro base station, as an intermediary. A corresponding system and computer readable medium is also provided.

20 Claims, 3 Drawing Sheets

AUTONOMOUS INFRASTRUCTURE WIRELESS NETWORKS

This application claims the benefit of U.S. Provisional Patent Application Ser. No. 60/576,581 filed Jun. 4, 2004 and PCT Application No. PCT/CA2005/000868 filed Jun. 3, 2005.

FIELD OF INVENTION

This invention relates in general to wireless communication network technology. This invention relates in particular to cellular network systems and architectures, and methods for deploying cellular networks.

BACKGROUND OF THE INVENTION

A wireless communication network generally consists of various transceivers (transmitters and receivers) that achieve inter-communication by means of the emission of electromagnetic waves. These transceivers, which are also referred to as radio access equipment, exist in different physical sizes and have different transmission/reception capabilities that are characterized by factors such as maximum signal transmission power levels, information transmission bit rate capability, ability to transmit or receive signals to/from a number of other transceivers, and supported frequency bands of operation. In terms of current systems, examples of this type of radio access equipment consists of small portable terminals such as cellular phones with multiple band capability or personal digital assistants with wireless access capability, portable radios with multi-band capability and higher power than cellular terminals, cellular base stations, wireless LAN access points, wireless cards installed in portable computers, etc.

Such radio access equipment can be classified into two categories: i) equipment that is shared by multiple users, i.e. undertakes communication to multiple users in different locations, and ii) equipment that is dedicated to a particular user. Shared equipment forms part of what is generally referred to as the network infrastructure. This equipment, or infrastructure, is deployed throughout a geographical service area. Other transceivers that venture into this area can communicate with the infrastructure equipment in a manner that is known.

Wireless networks can be classified in terms of the types of transceivers that they incorporate. These networks can be classified as i) infrastructure-only, ii) infrastructure-terminal, and iii) terminal-only. Microwave point-to-point networks are examples of i) since there are no terminals, cellular networks are examples of ii) since they include base stations and terminals, and ad-hoc networks such as WiFi (IEEE 802.11b & 802.11a) operated in ad-hoc mode are examples of iii).

Considering networks with infrastructure, in the most common case individual infrastructure elements are placed in fixed locations and connected to a fixed wire-line network such as a public switched telephone network (PSTN), a cable TV network (CATV), a power-line communication network, or to a local area network (e.g. Ethernet) that is connected to the Internet. An example is the case of cellular networks where the wireless transceiver that forms part of the infrastructure is called a radio base-station. In the case of local area networks current examples are access points for wireless LANs. These access points form gateways from a wireless LAN to a fixed network.

The first category of equipment in the above (shared by multiple users) is typically referred to as network equipment, and the second category is called terminal equipment. The network equipment is however not required to be fixed, and it is possible that future networks may have mobile base stations. In fact one example of such mobile base stations is base stations that are installed in moving platforms such as trains, buses, ships, and airplanes. One characteristic of network equipment versus terminal equipment is that typically it has a higher cost, is physically bigger, and typically has the capability to provide a connection to a number of terminals simultaneously.

The nature of current network infrastructure is that it must be deployed (or installed) using a non-trivial procedure, and often by a specialist, in order for a network to exist. We may classify the resulting networks into two categories, those that are installed and meant for the use of a private company, institution, (or household), where the set of users is restricted to a specific group, and those that are meant for the use of any member of the general public who undertakes a service contract with the so-called network operating company. Networks of the former type are called private networks, whereas networks of the second type are called public networks.

Currently cellular networks are the prime examples of wireless public networks, whereas local area networks, such as WiFi, set up in private companies or homes, are prime examples of private networks in the sense that they are meant to interconnect with a limited specific set of terminals. WiFi networks set-up to provide the so-called hot-spot service are examples of public networks. The main difference between cellular networks and hot-spot networks based on WiFi is that in the case of cellular networks, the network has a very wide coverage, and in many cases it covers whole countries. Hot-spot networks on the other hand cover specific limited locations and in some cases a number of these locations are interconnected by the same fixed network and managed by a single network operating company to form a single network with non-contiguous coverage.

As mentioned above, networks can be categorized into those that have an infrastructure component and those that are purely ad-hoc networks (terminal-only). The design of wireless networks with infrastructure components and mobile terminals has its roots in telephony, where the goal is to provide telephone service anywhere in a large coverage area and in effect introduce mobility to telephone networks. On the other hand, the design of purely ad-hoc networks has its roots in military communications that itself gave rise to the Internet. The design of communication networks is typically carried out using an approach that divides the overall task into a set of tasks that address issues at different levels of abstraction. There is a well known OSI 7-layer reference model that is used. In the case of wireless networks the physical layer refers to the level of abstraction, in this model, that addresses issues of modulation, error control coding, multiple access, and many other issues including power control and hand-offs.

Currently there are two main classes of wireless networks that are widely used: i) the cellular networks that are based on the various physical layer designs such as AMPS, IS-136, PDC, GSM, IS-95 (CDMA or "Code Division Multiple Access"), CDMA2000, and WCDMA, TD-SCDMA, and ii) the wireless LANs that are based on the physical layers IEEE802.11b,a,g. The different cellular standards have been classified into generations and currently we are at the third generation. As a result we will refer to all these cellular network technologies as 3G—since this is the current status of this line of technologies. In the case of wireless LANs the main physical layer currently in use is IEEE802.11b and IEEE802.11a and is referred to as WiFi.

The physical layers for 3G and WiFi are significantly different. The main reason for this difference is that the design of the WiFi physical layer was based mostly on the purely ad-hoc networking concept, whereas the design of 3G and all its predecessors was based on a network with infrastructure where a set of somewhat regularly placed base-stations provide coverage over a wide geographical area. However, as a result of wireless industry circumstances, the success of the 3G system in providing Internet access has been less than expected. On the other hand, the wireless Internet access based on the WiFi air interface has been successful not in the purely ad-hoc mode but in the infrastructure mode, i.e. in a mode where all access point that is attached to the Internet is employed. In a sense we have the WiFi network succeeding in an area for which the 3G air interface was designed, i.e. as an infrastructure network to access the Internet albeit with limited coverage.

In spite of the different design criteria, both the 3G and WiFi technologies are generally being used mostly as infrastructure for access by terminals. For the sake of clarity, "terminal" in this disclosure generally refers to a network-connected device associated with a user including a cell phone, handheld device, personal computer, or other computerized devices capable of wireless network connectivity. The key difference between these two technologies is the manner in which they are being deployed. The nature of deployment of a wireless network infrastructure is an important issue. In the past we have had a tremendous degree of emphasis on the capacity per unit base station as the key issue for the design of different air interface technologies. This capacity can typically be measured in terms of the number of voice users that a base station can support per MHz of spectrum allocated, or the aggregate bit rate per base station per MHz of spectrum in supporting a number of terminals. A huge degree of development in the different generations of cellular systems has been guided by this basic principle of maximizing the spectral efficiency per base station. These base stations are typically costly to install. This is because they are usually meant to cover a large service area and require a comparatively large power amplifier that is generally expensive. In addition, the installation of the transmitting antennas generally requires the rental of private facilities at the top of private buildings. Also, selection of a site to install a base station generally requires a very careful study of signal propagation and signal coverage by RF network planning engineers. These engineers represent perhaps the group of employees of an operating company with the most specialized sets of skills that are in many cases acquired in graduate university programs. Accordingly, they are generally a costly resource. The installation also entails the selection of transmitter power levels and antenna orientation. In a CDMA system such as IS-95 (2G) or CDMA2000 (3G) the installation also requires the configuration of the software with many parameters such as the initialization of the pilot offset neighbour lists, pilot search windows, pilot thresholds for the hand-off algorithm, etc. In a GSM (Global System for Mobile) network the configuration entails the selection of broadcast channel parameters, power levels, set of RF channels for transmission, and the frequency hopping algorithm to decide on the sequence of RF channels selected for transmission.

As mentioned earlier, the wireless cellular industry is now deploying third generation cellular systems—the so-called 3G systems. Third generation systems in the North American context exist in two possible modes—the so-called 1X and 3X modes. We are seeing the deployment of the 1X version, and it is not clear that there will be a business case for the deployment of the 3X version. The 1X system is based on a 1.25 MHz channel bandwidth that is compatible with IS-95, whereas the 3X system is based on the use of CDMA RF carriers with 5 MHz channels. In the forward link the multi-carrier option is used, whereas in the reverse link a direct spreading scheme with 3 times the IS-95 chip rate is used. The 1X system has a lower limit maximum bit rate that a user can achieve, however this is similar to the data rate goals of 3G in general. Also new developments in the 1X system, such as terminal antenna diversity, can improve the data rate. The result is that there may not be a compelling technical reason to introduce the 3X version.

The other main 3G standard is the European standard that is being positioned as the evolution of the GSM system in the direction of CDMA technology. Like the CDMA2000 3X system, the system utilizes RF CDMA carriers that occupy 5 MHz bands, but has quite a few differences in comparison to the CDMA2000 standard.

Meanwhile we have a major research program throughout the world targeting the next generation of wireless cellular systems. This generation is generally referred to as 4G, or beyond 3G. There is no general consensus as to what are the goals for this system except that somehow it should have more capability than the 3G systems to provide future services.

There is some expectation, however, that the progression from 3G to 4G (whatever it turns out to be) will be very different from the progression for the various generations up to 3G. The evolution of the different generations up to 3G basically stressed higher bit rates and greater network capacity for a given amount of allocated spectrum. For most of these systems the concept of the system remained somewhat the same. We had a series of more or less regular cells covering a service area with the base stations placed at the centers of cells. There were variations in cell size in the sense that we had macro-cells, regular-cells, micro-cells, even pico-cells. However the deployment strategies for these systems, remained somewhat constant. A cellular operating company acquired radio spectrum, with the price becoming increasingly higher over the years. It bought infrastructure equipment, installed this equipment using its specialized engineering capability and provided services to the public. Usually the services were billed by time, with some flat rate portions of plans at off-peal hours, or in the case of data services the billing could be per Mbyte of data transferred.

A major characteristic of the current status of the cellular system industry is the very high valuations placed on the radio spectrum as evidenced by the price that certain modest blocks of spectrum attained in spectrum auctions, especially in Europe where the values reached into the range of billions of dollars. As a result of these auctions many of the cellular operators were left without capital for investment in the 3G infrastructure, the introduction of higher data rate services was delayed, and the result was that the manufacturing sector was left without demand (or lesser demand) for the 3G technology that it had created.

At the same time wireless LAN's have become quite successful in the market place. These LAN's are based on the IEEE 802.11b and IEEE802.11a standards and utilize the ISM bands at 2.4 and 5 GHz. However these LAN's were designed with the emphasis on communication between terminals in an ad-hoc manner. As mentioned above, the channel access protocol used comes from the older research in packet radio network protocols that was developed with military applications in mind and meant for use in an environment where a number of terminals come together in an ad-hoc manner. However the current reality is that these networks are being used mostly in an infrastructure mode where they communicate with a base (the access point) that is connected to the Internet. A very successful use of this technology is in home area networks where the access point is incorporated into a router that interfaces a local area network in the home to a modem that connects to the Internet either through DS, cable TV system, or a power line based local access system. The access point now sells for the price of a terminal.

As a result of the design, with emphasis on ad-hoc operation, IEEE 802.11b networks are not very efficient in terms of spectrum usage, especially if they are being used in an infrastructure mode, so it is not clear what will happen with the resulting interference when a large number of access points are deployed in close proximity. It is likely that significant degradation of quality of service will occur. Also, there will be stress put on the system once wireless applications start requesting greater channel bandwidth than those currently available. Also, this is a technology that is different from cellular technology, although it is possible to build equipment that would automatically allow inter-operation of these two networks in a seamless manner. Whether these shortcomings are sufficient to stop the advancement of WiFi technology as it encroaches more and more into the cellular systems is not clear.

It is clear from the above that what is required is a type of network that has some of the characteristics of today's ad-hoc networks (based on the successful WiFi technology) in terms of ease of deployment and at the same time the characteristics of cellular networks with wider area coverage and higher spectral efficiency.

What is needed therefore is a communication network, system architecture and method of network deployment that allows expansion or deployment of the network by relatively easy installation of network infrastructure components, so as to allow network growth in an organic fashion in response to ad-hoc demand for capacity What is also needed is a method of deployment of a network that can be customer driven (users or private enterprises) or by the network operating company in a manner that is relatively fast and low cost.

SUMMARY OF INVENTION

One aspect of the present invention is an architecture for a "fourth generation" cellular system (4G). The invention consists of a networking method and architecture where the deployment of network infrastructure is carried out in an autonomous manner without the requirement for costly installation procedures. Such a deployment can be done either by the network operator (the cellular company operator) in an inexpensive manner, or it can be done by the customers in an organic manner. The autonomous deployment of infrastructure greatly reduces the cost per base station and together with the development of low cost micro base stations provides a solution for the organic development of cellular networks with a very large number of base stations (or access points) serving a mixture of large and very small cells with the result of a very large network capacity and the capability to meet expanding capacity demands required for emerging wireless services.

The present invention describes an architecture that has the capability to offer wireless coverage over large areas similar to the current cellular systems, and at the same time a solution to provide higher capacity access in hot-spots as an alternative to WiFi networks. The invention achieves these two goals by using a single unified air interface that works in both the wide-area mode and the hot-spot mode.

One aspect of the network method and architecture is that of universal frequency re-use similar to that of CDMA networks and the capability for backward compatibility with the current air interfaces, modified 3G air interface including the concept of sleeping pilot signals, and the future incorporation of modulation schemes that are robust to interference. However, other physical layers such as the GSM system are also incorporated in the disclosed network architecture.

One aspect of the present invention is a communication system and network architecture that includes one or more wireless micro base stations (herein called "small cellular access points") installed by customers, or users, or subscribers of the communication network and automatically configured (transmission power, possible antenna array parameters, and possible sleep mode parameters) by a network Controller so as to maximize coverage of a geographical area, reduce inter-cell interference, and generally optimize the transmission parameters so that the network attains a large transmission capacity. The small cellular access points provide access to a Local Area Network (LAN) or a Wide Area Network (WAN), or a DSL access network, or a cable TV access network, operated by the network operating company (or service provider, or cellular operator, or cellular operating company), or a telecommunication network that utilizes the power lines for transmission. The small cellular access points are configured automatically by a Controller that belongs to the network operator. The small cellular access points enable connectivity between one or more terminals linked to customers, on the one hand, and the communication network, on the other hand. The small cellular access point of the present invention enables establishment of connectivity to a cellular network having characteristics similar to a WI-FI "hot spot" network in the sense that provision of services with high bit rates to a large number of users becomes feasible, but having the advantage of using a modified third generation (3G) cellular access technology that is compatible with 3G technology Another aspect of the present invention is that the small cellular access points interoperate with other base stations (such as large base stations installed by the network operator, also herein called "large cellular access points") to provide network connectivity to terminals other than the terminals of the customer who has installed a particular small cellular access point. This interoperation is managed by the Controller. Accordingly, another aspect of the present invention is a method of deploying cellular wireless networks utilizing micro base stations as cellular base stations based on the automatic configuration of its transmission parameters by the Controller.

Another aspect of the present invention is a communication system that includes a Controller configured to manage the interoperation of the micro base stations with other base stations to provide network connectivity using a common block of spectrum. The Controller includes a computer program that is another aspect of the present invention, operable to instruct a server linked to the cellular type network to process instructions consisting of steps that define the operation of the micro base stations in the context of the cellular network. These steps also define a further method of the present invention.

Another aspect of the present invention is that the Controller (particularized in the description) constitutes an additional component of software in a base station cluster controller (a well known component of a cellular system) whose function is to perform automatic configuration of the base stations in its cluster. Another aspect of the invention is that the base stations have a mode of operation where a pilot signal or broadcast channel is not transmitted continuously, or periodically transmitted. The base station contains a sleeping pilot signal or sleeping broadcast channel that becomes awake after the transmission of a wake-up signal by the terminals.

Another aspect of the invention is that each base station periodically analyzes the channel (i.e. receives a composite waveform of signals in the channel) and sends the information to the Controller, and where the Controller processes such information to detect the presence of unauthorized radio signals transmitted in the channel.

BRIEF DESCRIPTION OF DRAWINGS

A detailed description of several embodiments of the present invention is provided herein below by way of example only and with reference to the following drawings, in which:

FIG. 3c illustrates the present invention in which the fixed access point is connected to a Broadband wireless backbone. The CAP connects as an element to a fixed (or portable) broadband wireless network, e.g. IEEE 802.16, or IEEE 802.11a.

Figure 1:
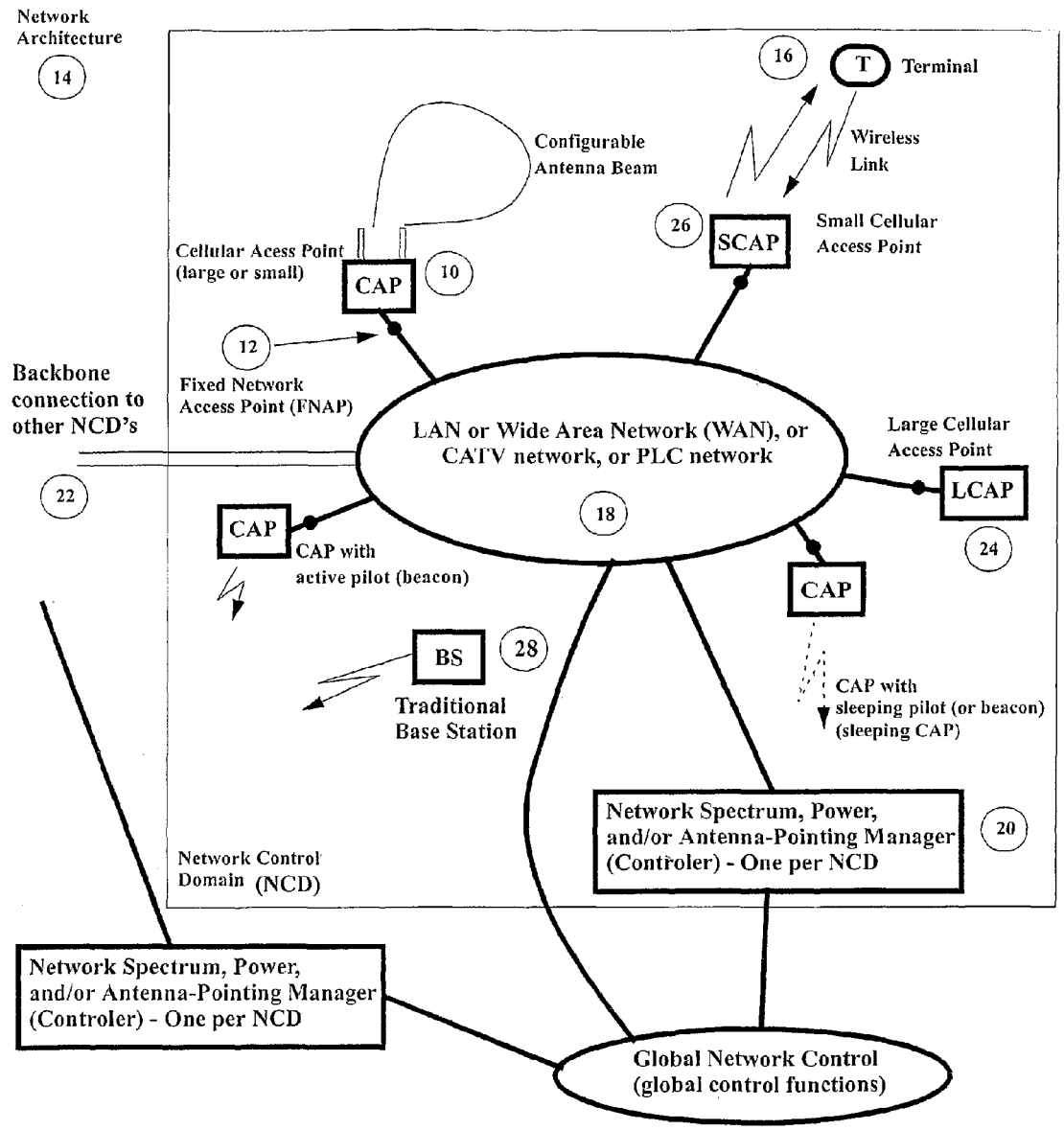
FIG. 1 is a diagram illustrating the network architecture of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION

In the evolution of cellular networks, in addition to the effort required in planning the location of the base stations and the network optimization referred to above there is also significant effort required to deploy a network of trunked lines to interconnect the base stations to the public switched telephone network (PSTN). However, with the evolution of other networks such as local area networks interconnected by the Internet, extension of the telephone network to provide high speed data access over ADSL (asymmetric digital subscriber line) and cable networks, we now have the capability to bring cost effective network connects (fixed network access points, FNAP) to many locations throughout a population center or an enterprise. As illustrated in FIG. 1, fixed network access points (12) with high data transmission capability represent points at which we can install cellular access points or CAP (10) (whether large or small, as explained below) in a new wireless network based on the network architecture (14) of the present invention. These CAP's (10) are much more numerous than the number of base stations in a traditional cellular network. Also their locations do not necessarily follow a pattern that is optimum in terms of coverage such as the ideal hexagonal cellular pattern of a cellular network. As a result it is imperative that the air interface should be designed so as to allow for the automatic installation of the CAP's (10), in a manner that is known, and as further particularized below.

As shown in FIG. 1, the network (14) consists of a set of terminals (16), fixed network access points (12), CAP's (small or large) (10), and a wide-area network (18) that connects the fixed network access points (12) to a network spectrum/power/antenna-pointing manager or Controller (20). We refer to all the CAP's connected to a single Controller as a network control domain (NCD). The network control domain operates over a geographical local region. Different network control domains can be inter-connected by a backbone network (22).

The present invention provides a method for deploying a cellular wireless communication network with the autonomous wireless infrastructure described herein. A modified cellular wireless communication network, as well as a system and related computer program for defining a network controller for managing the autonomous wireless infrastructure described, is also provided. It is important to understand that in this disclosure by "cellular wireless communication network" the broader communication network is meant, which includes not only the portable devices, and the base stations that define the cellular zones by operation of the network controller, but also the broader wired/wireless network that is used for interconnecting base stations, including fixed elements and/or point-to-point wireless links.

One aspect of the present invention is that the cellular access points (10) are installed by the customer in an autonomous manner. The CAP's (10) of the present invention are designed (as particularized below, and otherwise in a manner that is known to those skilled in the art) to be low-cost communication infrastructure devices having a cost that is preferably similar to that of IEEE 802.11b WLAN access points. The customer could go to a local telephone store, such as those operated by the network operator and purchase a CAP that is a small access point (10) that is based on the modified 3G technology of the present invention rather than one based on the IEEE 802.11b standard. These CAP's (10) connect to the backbone network (22) via a local area network, or through a wide-area network using for example DSL, or cable access.

The present invention, in one of its embodiments, contemplates the use of a physical layer employing a modulation scheme that has the properties of spread spectrum and is robust to interference. With these properties the radio spectrum can be reused in every-cell in the system just like the CDMA systems based on IS-95 or the 3G standard (CDMA2000 or WCDMA). This type of modulation also allows for universal frequency re-use by each cellular access point—a requirement that is necessary due to the autonomous growth of the infrastructure nodes (small cellular access points or large cellular access points, (10)).

Communication between the terminals (16) and the cellular access points (10) utilizes for example an FDD (Frequency Division Duplexing) air interface, with the possibility of a future unbalanced spectrum allocation (forward/reverse link), and the possibility of a time division duplex (TDD), also included in the autonomous cellular network.

One of the aspects of the invention is the autonomous growth of the network architecture described, that it is possible with automatic configuration of the cellular access points (10), and a modulation scheme that has the properties of universal frequency re-use. This means that the frequency re-use cluster size is equal to 1. CDMA techniques are the prime candidates for modulation. However, current and future modulation schemes, specifically optimized for this network architecture, are possible. In particular GSM networks with dynamic selection of the frequency hopping channel set and hopping algorithm is also possible and an important modulation given the degree of deployment of GSM networks.

Possible air-interfaces that can be used in the communication network of the present invention include:
- IS-95 based CDMA systems (backwards compatibility with installed CDMA base stations—but not optimized to reduce interference).
- IS-95 based CDMA systems with the incorporation of a sleep mode, i.e. small modifications to IS-95.
- GSM with dynamic selection of frequency hopping set and frequency hopping sequence.
- WCDMA based systems (with and without sleep mode).
- CDMA2000 1X or 3X system (with and without sleep mode).
- EDGE air interface and other evolutioned of GSM to high data rate transmission.
- Other Wideband based CDMA system.
- 1X EV/DO system.
- A new air interface based on the use of MIMO with spread space communication, e.g. spread space-spectrum multiple access (SSSMA) recently developed at University of Toronto.
- An interface that is based on multi-carrier CDMA.
- All of these interfaces assume the capability for the transmission of a pilot signal with a code that identifies the access point to the Controller. This function is required for the automatic configuration of the cellular access points (10).

While the cellular access points (10) will generally consist of the low cost micro base stations described above, in accordance with one particular aspect of the present invention it should be understood that based on network infrastructure considerations explained below, it may be desirable at specific geographic points that a cellular access point (10) actually consist of network infrastructure and related components similar to those included in a base station in the current network. Cellular access point (10) in this disclosure refers to both base station types, small and large cellular access points.

Another feature of the proposed architecture is the automatic configuration of the cellular access points (10) upon installation. In order to support this function these cellular access points are given the capability to perform certain functions (in a particular embodiment), in a manner that is known:

The cellular access point (10), in the case of a CDMA air interface, can be configured with a given pilot transmission power. The allowable range of transmitter powers will determine the cost of the access point and ultimately its deployment strategy. Very low power access points will be inexpensive and can be purchased and installed by the customer
  autonomous installation and organic network growth. High power cellular access points (24), or large cellular access points, require coordinated installation by an RF specialist, subject to health regulatory requirements, and general RF interference considerations, and other known requirements.
State: the cellular access point (10) is "ON" or "OFF" in the sense that a pilot channel or broadcast channel is or is not being transmitted. It is always "ON" for large cellular access points (24). For small cellular access points (26) in accordance with this invention, it may be in sleep mode if there is no traffic.

A cellular access point (10) reports its antenna configuration to the Controller (20). This applies to the case where the cellular access point (10) utilizes an antenna array (which may consist of as few as two elements). Configuration generally depends on the concept of antenna beam angle pointing. In a micro-cellular environment the notion of a beam is not clear due to the rich multi-path propagation environment, i.e. we can not form ideal cell sectors. However, a multi-antenna element signal processing algorithm will still be utilized. This algorithm will yield a set of antenna configurations that can be selected by the Controller.

The cellular access point (10) reports its transmitter power to the Controller (20), and will receive commands from the Controller to set the transmitter power.

The cellular access point (10) may (optionally) report its GPS (Global Positioning System) coordinates to the Controller (20), if it has GPS, capability.

The cellular access point (10) measures the signal strength on all the pilots that it hears from neighbouring access points (10) and transmits them back to the Controller (20). Alternately it may measure, or demodulate, the broadcast channels of all the neighbouring access points. A vector of coordinates is transmitted with individual entries being a pair (base station ID, or pilot ID, or auxiliary pilot ID, pilot power received).

The cellular access point (10) may have the capability to transmit a wake-up message to neighbouring cellular access points (10) in order to get them to transmit a signal so that their pilots can be received and the Controller (20) can establish an interference matrix between cellular access points (10). This is a matrix consisting of elements ($I\_ij$) which denotes the interference received at cellular access point "j" when cellular access point "i" transmits.

The Controller (20) will function. This type of algorithm can be designed by those skilled in the art, such as personnel charged with designing algorithms for cellular network resource allocation. The prime example of a cost function is the minimum pilot transmission power for each cellular access point (defined in some manner for a set of cellular access points) so that a certain geographical area is covered.

A traditional cellular network generally has a five level architecture hierarchy including (i) the mobile terminal, (ii) base stations that communicate directly with the terminals, (iii) base station cluster controllers that control a group of base stations and control hand-offs between base stations, with a group of base stations controlled by a cluster controller, (iv) mobile switching center (MSC) that connects to the cluster controllers and interfaces the cellular system to the public switched telephone network, and (v) a backbone network that interconnects MSC's. Without soft hand-off, in the case of CDMA, this architecture is basically a tree from the terminal to MSC levels and a mesh backbone at level (v). In this case the terminals are assigned to specific base stations depending on the coverage from each of the base stations and location of the terminals. In the case of soft hand-off the terminal should be understood as belonging to a multiplicity of base stations simultaneously. A terminal that communicates with a given base station is considered a member of that base station. Membership of terminals in base stations can be determined by a cellular structure. A geographical area is partitioned into a set of cells. The cells need not be of the same size, and they also need not be regular geometrical shapes. The cells will in general have irregular boundaries depending on the propagation conditions that depend on terrain and man made structures such as hills and buildings.

In a cellular network such as a GSM or CDMA network, a terminal and a base station utilize power control. The transmitter power is set to a value that is sufficient to achieve a given signal strength, or signal to noise ratio (SNR), at the receiver. However in order to carry out the power control functions the terminal needs to know which cell it belongs to, i.e. if the terminal moves away from the base and power control function increases the power transmitted to the terminal from the base station, there is a point at which this process ends and a hand-off is executed. Such a point is determined by the strength of a broadcast signal that in a sense defines the size of the cell, or in effect the cell boundary. In the GSM system this signal is the broadcast channel (BC), and in the CDMA system such as IS-95 and CDMA2000, it is the pilot and synchronization channels. As a result, the size of a cell in a cellular system is defined by the strength of the transmitted broadcast channel, or pilot channel, or beacon channel. We refer to any of these channels generically as the beacon channel—assuming the CDMA system case. The actual cell region is defined by the transmitter power of the beacon signal, the propagation environment (hills, buildings, and structures), and the characteristics of the transmitting antenna in terms of the radiation pattern. In an open environment and with an omni-directional antenna the radiation pattern is circular and the radius of the cell is dependent on the transmitter power. In a classical cellular system the goal is to assign transmitter signal powers (beacon signal power) so that a given service area is covered and the degree of coverage overlap (i.e. coverage of a given point from multiple cells) is minimized. State of the art cellular systems typically have fixed sectorized antennas, i.e. in a given cell there is either an omni-directional antenna (radiation pattern over 360 degrees), or directional antennas with 3, 4, or 6 directional antennas, each covering a sector of the cell with nominal angles of 120, 90, or 60 degrees respectively. The installation of the base station requires the orientation of the antenna sectors within the cell, the selection of transmitter power levels per sector, the possible antenna down-tilting, and the selection of cell site parameters, such as (in the case of CDMA) pilot sequence offset, and various other operation parameters that typically are transmitted in the synchronization channel (Walsh function 32 in the IS-95 CDMA system). An evolved system would incorporate a switched beam antenna at the base station. The antenna would contain a number of possibly overlapping beams which could be selected for transmitting to the different terminals.

The autonomous cellular system of the present invention is different from the current (existing) cellular system in that each base station has the capability to sense its environment. It can measure the strength of various beacon signals from neighbouring cells and beacons within cells associated with different antenna beams. It can determine the identities of these cells and beams and transmit them to a Controller. In the preferred embodiment the transmission to the Controller would be over an IP (Internet Protocol) based network. Also in the preferred embodiment, the Controller would be controlling a set of base stations that is similar to a set of base stations controlled by the cluster controller in a current cellular network. The functions performed by the base station cluster controller would be augmented to include automatic configuration in the autonomous cellular system. Base stations having these attributes can be designed, manufactured and configured by those skilled in this particular art.

The Controller in the autonomous cellular system may be designed with different degrees of functional complexity. In the simplest case the Controller would use an algorithm to determine the main parameters for the different base stations, including transmission power and antenna beam orientation. The network would be similar to a current network but with the automatic configuration, and with the configuration not changing frequently. At a more sophisticated level the Controller could be performing a dynamic network optimization by performing resource allocation for a group of base stations. Such an algorithm would be continuously making adjustments to the various base station parameters and at the same time performing joint scheduling of traffic.

We consider here an example of such an algorithm. We modify the air interface of a 3G network so that periodically we dedicate one slot of time in the forward link only for the transmission of the pilot and synchronization signal. All the other signals carrying user traffic or paging information are turned off. This period may be several seconds and the length of the time slot could be equal to one power control group (1.25 ms in CDMA2000, or 0.666 ms in WCDMA). We refer to this slot as the interference measuring slot. In a sequence of these slots we introduce another period L where in one slot per period (one in L) each base station goes into listening mode where it measures the signals from the other base stations. In the remaining slots the base station is in transmission mode. The listening slots for the different base stations are staggered using a randomization algorithm so that when a base station is in listening mode, the probability that all the others are in transmission mode is high. With a long enough measurement time the spread spectrum signals (pilots) have enough processing gain for the listening base station to determine the signal strengths of a number of simultaneously transmitting base stations. The measured signals from all base stations are then sent to the Controller. Based on these signals received at the Controller, the Controller will run an algorithm that will result in a decision to increase the pilot strengths of some of the base stations and decrease the pilot strengths of others. There are many possible algorithms here, but assuming that all the base stations have the same transmitter power limit, the algorithm would attempt to determine the approximate position of the different base stations and then calculate a set of transmitter powers that in some way maximizes coverage and minimizes interference of the pilot signals.

In an alternative mode of operation, in the case of a very low number of terminals per base station (the above applies to a higher number of terminals), the base stations are all in sleep mode until there is a wake-up signal transmitted by a terminal. The wake-up signal is received by a number of base stations that transmit the signal identification together with the signal strength received to the Controller. The controller then determines the base station that received the maximum signal and commands that base station to respond to the terminal and initiate a connection with that terminal. Each new user (terminal) attempting to initiate a connection with a base station is treated in the same manner. The algorithm being run at the controller would generally allocate the terminal to the base station receiving the highest signal, but there could be exceptions where the allocation to a base station receiving a lower signal strength could result in lower inter-cell interference.

The communication network architecture of the disclosed autonomous cellular network will in general consist of an irregularly placed set of cellular access points quite different from the regular "hexagonal cell" structure that we have been accustomed to in the current (existing) cellular networks. In general there may be a mix of large and small cells sharing a common frequency band (one RF carrier in a CDMA air interface), or we may decide to group the small cells within one RF carrier (one network control domain) and the large cells within another RF carrier.

As stated earlier, some cellular access points (10) preferably have a large capacity (large access points) and have a functionality similar to that of current base stations and a cost somewhere in the neighborhood of tens of thousands of dollars, or a small capacity small access points) with costs as low as the cost of a terminal. The large access points will be on permanently and transmit pilot signals that identify a certain coverage region (a cell). The small access points will operate in a sleep mode in order to reduce the "pilot pollution" (pilot interference) that is a feature of IS-95 and 1X networks, (i.e. cause too much interference by pilots transmitted from access points that are not handling any traffic).

Small cellular access points will be listening to the reverse link channel on a common access code pattern. Terminals (16) wishing to communicate will initially transmit a probing signal to try and wake up sleeping access points (10) (e.g. "hello! I need service. Is anyone here?"). After the probing signal is transmitted, the cellular access point (10) awakes and starts transmitting a pilot signal. The terminal (16) then accesses the system through this pilot just like in a 3G cellular network. In some cases more than one cellular access point will be awaken and the terminal (16) will access the one with the stronger pilot in a manner that is known.

The cellular access points (10) are installed in one of two manners:
1. By a network operator using a similar methodology to that currently used to install base stations (28). This involves coverage considerations, leasing arrangements, RF radiation considerations with respect to biomedical issues, etc.
2. By a customer in an autonomous manner. This may be as a result of lack of capacity in a certain area or the cost to use another access point (10). This is driven by the user in response to specific needs and the installation process is similar to that of an access point for a current WiFi network.

If installation of the cellular access point (10) is by the public network operator, then the power of the transmitter (nominal value, size of cell) can be set by standard cellular planning, followed by possible fine tuning from the Controller, in a manner that is known. If installation of the cellular access point (10) is by the customer then the Controller configures the transmitter power taking into account all the parameters reported by the access point (10) back to the Controller (20). This occurs by operation of the access point (10) infrastructure in cooperation with software control running on the Controller for a specific network control domain, in a manner that is known.

Therefore one of the aspects of the present invention is that it enables participation of the customer in the deployment of the communication network infrastructure. There are two principal deployments. First, a residence where the customer installs a cellular access point (10) that is connected to a wideband access service such as DSL or CATV network. The network is controlled by a Controller (20) operated by the owner of the spectrum (the service provider), in a manner that is known.

Second, there is a campus or complex that contains a local area network. The access points (10) connect directly to the ports of the LAN. The home environment is a special case of a LAN with a single access point.

In accordance with the invention, the network operator will generally only manage the Controller (20) and does not need to invest in the infrastructure deployment—at least in heavily built up areas, although it may choose to do so. The deployment of the wireless infrastructure can be done in an autonomous manner by the customer. The spectrum used may be owned by the network operator (e.g. standard cellular or PCS spectrum), or it may be unlicensed spectrum such as that of the ISM bands, or it may be some future block of spectrum such as that currently allocated to TV broadcasting. This would result in more spectrum being available to the network operator. In the case of ISM bands being used (the free spectrum) a physical layer that is not based on FDD must be used. TDD modes available in the 3G standards could be modified with the inclusion of sleep modes for such a spectrum allocation (one block).

The Controller (20) also performs network security functions such as authentication of the user and the establishment of a call. The user sets up a call, i.e. logs into the network, and then goes into an IP transmission mode. The session is encrypted. The charges for the wireless access will be based on a combination of charges for the use of the wireless access (possibly free for the owner of the cellular access point (10)), or possibly combined with a flat-rate service from the network operator. The cellular access point (10) could make itself accessible to other users in the network. The connection is managed by the network operator. For example, a contract between the network operator and owner of the access point (10) is made so that a credit is given to the access point owner for carrying third party traffic. Many business models are supported by the present invention.

A typical FDD cellular/PCS system has a number of frequency bands allocated. For example, in an IS-95 CDMA or CDMA2000 1X, these bands (channels) have a bandwidth of 1.25 MHz. The Controller manages each of these bands separately, if there is a single user in a cell and the access point needs to turn on one of the CDMA carriers then it has an option as to which one it will choose, and this choice may depend on the CDMA carriers being used by the neighbouring bases stations. A minimum system will utilize a single band, e.g. a single IS-95 type of CDMA carrier. In the case of multiple CDMA carriers the Controller (20) can allocate traffic to different bands (i.e. manage the bands appropriately) so as to increase the traffic carried by the network.

By way of example, the present invention can be utilized by a cellular operator operating a CDMA network with 1.25 MHz CDMA carriers. A typical North American system operating on a 5 MHz block of spectrum (i.e. 5 MHz forward link and 5 MHz reverse link) has the capacity for 3 CDMA carriers, with half a channel of guard band on each end of the block.

In the case of 10 MHz blocks the number of carriers is 7. The autonomous cellular system of the present invention can allocate a single CDMA carrier for the use of small cellular access points (26) and the other CDMA carriers for the use of large access points (24). Small cellular access points (26) will be installed by customers. Large cellular access points (24) in urban areas will be installed by the network operator and in rural areas, where there is little traffic, by customers (e.g. in farms). With this installation approach we will avoid having cells with very large power (strong pilots) adjacent to cells with weak pilots which may result in unfavourable interference conditions.

The present invention therefore can be understood as an autonomous infrastructure wireless network, i.e. a wireless network that is deployed using autonomous installation by customers, whether in whole or in part. This results in significant advantages of reduced cost, organic growth and also enabling more efficient allocation of spectrum. The result will be a network with the capacity to provide a much larger set of services than current cellular systems with the same overall spectrum allocation.

Preferably the physical layer of the communication network infrastructure of the present invention is designed to encompass characteristics that allow the organic deployment and growth of the network. Such a network consists of base stations that can be modeled as black boxes. These base stations have an interface to a fixed network on the one side, or a wireless point-to-point link to another base station, and a radio interface (or second radio interface) that may configure simultaneous connections to multiple mobile terminals. We refer to these two interfaces in the black box base station (which include the access points (10) described) as the backbone and the access interfaces. The backbone interface could be an interface to a wire-line network such as an Ethernet, DSL connection, cable modem connection, or a fixed wireless point to point connection based on an air interface such as that provided by the IEEE 802.16 standard (WiMAX)

Operation of the present invention is best understood by reference to steps 1 through 4 below, where step 1 describes the characteristics of the cellular access point being connected. In particular these steps illustrate how the cellular access points (10) of the present invention are integrated into the operation of the broader cellular network based on the communication network architecture of the present invention. It should be understood that steps 1 through 4 below are an example of operation of the communication network architecture described in this invention. Other implementations and therefore other methods of operation are possible. Also, for clarity, it should be understood that the references to "cellular access points" refers to either a small cellular access point (26) or a large cellular access point (24)."

1. The cellular access point is designed to support a particular air interface using the autonomous infrastructure wireless network auto-configuration protocol. This air interface will provide connectivity to any of the terminals that wish to connect to this particular cellular access point. Examples of these air interfaces are modified CDMA air interfaces obtained from evolutions of IS-95, CDMA2000, and WCDMA systems, and also evolutions of non-spread spectrum systems such as GSM.

2. Upon connecting the cellular access point (10) to the backbone network through the fixed network access point (12) a connection of the cellular access point to the Controller (20) is established. This Controller (20) has the task of configuring all the cellular access points (10) within a given network control domain. The Controller (20) will probe the cellular access point for a set of configuration parameters. These parameters specify the capability of the cellular access point and include the following: set of air interface parameters supported by the base station such as CDMA type and version number, set of frequency channels supported (i.e. set of CDMA carrier frequencies), transmitter power level, aggregate data rate supported, antenna pointing configuration parameters, set of transmitting and receiving frequencies for the transmission of traffic, and the set of frequencies for transmitting probing signals, and the frequency for transmitting the beacon signal. In a typical frequency division duplex (FDD) network there are two blocks of spectrum used by the system. We refer to these as the high block and the low block. The high frequency block is used for the base station to transmit (mobile terminal receive) and the low frequency block is used for the terminal to transmit (base station receive). However in order to carry out a configuration procedure it is preferred that the base station also have the capability to receive signals in the high block, i.e. the base station should have the capability to receive signals transmitted by other base stations. The base station may also have a Global Positioning System (GPS) receiver, or an equivalent system to determine its geographical coordinates. All of these parameters should be sent to the Controller (20).

3. Having learned the capability of the base station, the Controller (20) will then send a command to the base station requesting it to do an analysis of its radio environment. This analysis consists in scanning a given set of frequency bands and reporting the results to the Controller (20). For example in a CDMA system the base station would scan all the so-called CDMA carriers and report the information received in the discovered pilot signals to the Controller (20). This information would consists of pilot signal strength and pilot PN code offset, or pilot ID, or auxiliary pilot ID, or cell ID, or sector ID, (where ID refers to an identification number) and the system information associated with such a pilot signal in a CDMA system. In other systems the report would consist of a set of signal strengths and base station identification parameters. With this information from all the base stations (and possibly also the geographical coordinates) the Controller has enough information to determine an approximate network graph with a set of active base stations and the signal strengths received at each base station from a set of neighbouring base stations. For example, a large number of base stations being monitored at a given base station indicates that in general some of the pilot signal powers of the terminals could be reduced—thus reducing what is sometimes referred to in a CDMA network as pilot pollution (pilot interference).

4. After the cellular access point reports its parameters to the Controller (20) and the Controller leans as much as possible about the radio environment in the vicinity of the cellular access point, the Controller (20) will command the cellular access point to enter one of a number of possible operating modes in order to be a potential provider of connectivity services to mobile terminals that may venture into the vicinity of the given base station. Three of the possible modes are i) continuous transmission of a beacon signal such as a pilot signal in the IS-95 CDMA system, ii) pulsed transmission of a beacon signal . . . i.e. the transmission of a signal with a given duty cycle, or bursty pilot, iii) the occasional transmission of a pilot signal with the purpose to pass signal strength information to neighbouring base stations, iv) a sleeping pilot signal mode where the base station is in active mode and is monitoring a universal access channel that is known to all the mobile terminals, and v) the inactive mode where the Controller (20) decides that the cellular access point is not required for the foreseeable future or the Controller (20) decides that the cellular access point has some malfunction. Other modes with similar features are possible.

In the case of a CDMA system, the continuous beacon mode consists of the transmission of a pilot signal together with a synchronization signal (Walsh function zero and Walsh function 32 in the IS-95 system). The synchronization signal should contain information that the terminal (16) can use to access the given cellular access point—i.e. from the synchronization signal the terminal finds out the access channel that the cellular access point is monitoring. In the case of an IS-95 CDMA system this access channel is a PN code mask for the reverse link. Other parameters such as the identity of paging channels are also contained in the synchronization signal. Mode (ii) is similar to mode (i) but anticipates that future CDMA-like cellular systems may contain non-continuous pilots. Mode (iii) is meant to make it possible for cellular access points that are essentially in sleep mode to transmit signals to announce their presence to neighbouring cellular access points so that a network interference graph can be built by the Controller (20). Mode (iv) is required for a system that has a large number of small access points (26) that for the most part are not providing connectivity service to any of the terminals (16). In mode (iv) operation the cellular access points can wake up by receiving a wake-up signal in a manner that is known from a mobile terminal (16). In a CDMA system like IS-95 the standard needs to be modified so that during the call set-up phase if a mobile terminal (16) does not find any pilot signal then it starts transmitting the wake-up signal. The terminal (16) transmits the wake-up signal without having achieved CDMA network synchronization. Hence the wake-up signal should be a short PN code that repeats continuously for a given period of time that is greater than the channel monitoring period of a base station that has a sleeping pilot. A base station with a sleeping pilot wakes up for a short period of time periodically in order to monitor the possible presence of a wake-up signal being transmitted. The concept of sleep mode is well known in electronic devices that operate on batteries and in other devices where energy saving is crucial. In the present invention, however, the sleep mode has the purpose of decreasing interference in the network and not the saving of battery energy. A classical cellular network typically has a channel that announces to the environment the presence of the base station. The continuous transmission of this channel (pilot in CDMA) is not desirable in a small cellular access point (26) that for the most part may not have any active communication with terminals, i.e. is not being used by any terminal due to the very low density of terminals.

One advantage of the present invention over existing cellular networks is that it puts the control of infrastructure deployment partly in the hands of the customer. This could have the effect of stimulating the deployment of wireless services. It will turn the infrastructure market into a market that is similar to the personal computer market. Growth and usage of wireless services will be more organic. Users will automatically deploy infrastructure to satisfy their needs in hot-spot locations. At the same time the service provider (cellular operating company) will make sure that there is complete wide-area coverage. Customers will do their own analysis of the cost. On the other hand, the fixed network operator will be provided with more traffic and more revenue. This is because, regardless of the rate schemes for the usage of customer deployed small cellular access points, there will be more traffic on the operator deployed large cellular access points part of the network. In this case the overall effect of this architecture on the business of a cellular operator would be positive. The cellular network operator will also insure that the network is secure by possible providing security through a security server In a key embodiment of the present invention the network described herein is deployed by a (fixed) network operator. If a small number of cellular access points (10) are deployed by the customer and connected to the fixed network operator, ultimately the traffic on the autonomous cellular network is controlled by the fixed network operator. In one particular aspect of the present invention, a typical DSL link from a PSTN to a customer is actually operating under the control of the fixed network (i.e. PSTN) operator, where a portion of the traffic is DSL customer traffic (as in the current use) and the other portion of the traffic is wireless traffic generated by third party customers.

Security Function

The Controller (20) will set up a secured access session between the terminal (16) and the cellular access point (10) in a manner that is known. This includes encryption and authentication. The Controller (20) will also determine if unauthorized transmitters are using the spectrum. One way to determine if this has happened is when the cellular access point reports pilots to the Controller that are unknown to the network. Where the network operator owns the spectrum, the distribution of cellular access points (10) to the customers is controlled by the network operator. These cellular access points (10) will have identities. These identities will be transmitted in the pilot. The identities are reported to the Controller (20) by the access point (10) so that the Controller can determine if the cellular access points (10) are authorized to use the given spectrum.

Communications Store of the Future

Telephone stores are typically operated by public operating companies as a method to distribute equipment to the end users. Currently these stores generally distribute only terminal equipment, e.g. mobile and fixed terminal equipment such as mobile phones, pagers, satellite receivers, etc. The communications store of the future, in accordance with the present invention, will carry, in addition to terminal equipment, also network infrastructure equipment, and specifically cellular access points (10) with various capabilities for transmitter power and bit rate capacity. For a modified 3G 1X system this would include the power rating, the maximum aggregate data rate, the set of RF CDMA carriers supported, and generally frequency band capability.

It should be understood, that in accordance with one aspect of the invention, the network operator could decide to ask a particular customer to install a cellular access point (10) having capabilities in excess of those of the small cellular access point, based on particular network requirements in a particular geographic location, or other factors. The telephone store could be used to distribute cellular access point (10) equipment to customers having these enhanced capabilities.

A telephone store of the future would look like the following:

Terminal Equipment (telephones/pda terminals, pagers, satellite terminals)
all the different models with different capabilities for display and memory
possible multiple mode terminals (AMPS/IS-95/CDMA2000/GSM 1X-EVDO/Auto Cell, or autonomous cellular capability)

Cellular access points (let us measure the power rating relative to that of a terminal)
frequency band capability. Specification by frequency band.
different models: power rating, antenna configuration capability, of a current mobile terminal
0 dB section: same power rating as a terminal, mostly for home application, single RF carrier.
10 dB section: upper limit of customer installed, small business
50 dB section: multiple RF carriers, installed by an RF specialist, mostly network operator installed.

Network Operation Mode/Spectrum Regulation

Currently there are two main types of spectrum allocation/regulation: 1) Licensed for a carrier, e.g. cellular/PCS system, and 2) unlicensed, e.g. ISM-band/NII. We also currently generally have two types of network operation: 1) public, with the operating company installing the infrastructure and 2) private, where the installation of the infrastructure is privately done in a home or enterprise. The proposed new system architecture operates in a number of scenarios as shown in the following Tables.

| Wireless Network Operation Modes/Business Models | | | |
|---|---|---|---|
| Spectrum Regulation | Public Network | Private Network | Public Traffic on Locally Private Network |
| Licensed Band | Current cellular system | Current system in restricted access mode (e.g. spectrum used for testing) | Leasing of spectrum |
| Unlicensed Band | Public WiFi networks - hot-spots (e.g. airports) | Current main use of WiFi (e.g. homes, enterprises) | Current piggy-backing of public traffic on private WiFi, e.g. WiFi without security enabled. |

| Wireless Network Technology Choice | | | |
|---|---|---|---|
| Spectrum Regulation | Physical Layer Standard | Switching Mode | Proposed Wireless Network Concept |
| Licensed Band | Cellular technology, circuit switching 1 G, 2 G 3 G => CDMA | Circuit switching (origin in telephone network) | Single Autonomous Cellular: Hybrid of ad-hoc deployed CAP's + planned deployment of CAP's using dedicated spectrum. |
| Unlicensed Band | IEEE 802.11, various modes, various bit rates (2.4 GHx, 5 GHz) | Packet switching (origin in computer networks) | Possibly multiple autonomous cellular networks sharing common spectrum. Use of cooperative game theory principles in the controller |

Compatibility with Current Cellular Systems

Physical Layer The physical layer for the communication network architecture described herein is preferably based on some form of interference resistant modulation scheme. CDMA systems (e.g. CDMA2000) can be adapted to the proposed networking concept—e.g. addition of sleep modes for small cellular access points (10). The GSM system is less flexible for evolving to the autonomous cellular network described, however, adaptation is possible in a manner that is known. This would be achieved through the use of dynamic channel allocation in the cellular access points under the control of the Controller. The difficulty is in the minimization of interference given the highly irregular cell structure of the organically deployed network. However, not withstanding spectral efficiency it is possible to devise a dynamic channel allocation algorithm if there is a sufficiently large block of spectrum available to the system—i.e. if the number of 200 KHz channels available to the system is sufficiently large. A modulation scheme with universal frequency re-use, and no need for frequency planning, is the preferred choice. A modification of CDMA2000 1X air interface, or a modification of the European ETSI WCDMA standard is the prime example of such a desirable modulation format.

Evolution of Cellular Systems

Numerous research groups are working on next generation cellular technologies throughout the world. However, there is currently no common set of goals or criteria to determine the objectives for such a network. In some cases researchers mention much higher data rates (10's of Mbits/s), different modulation formats (e.g. OFDM), unbalanced allocation of spectrum, and place a great emphasis on different services. The different generations of cellular systems can be summarized as follows:

- 1G—Analog, 800 MHz band (in North America), FM modulation, somewhat regular cell deployment
- 2G—digital, primarily voice, single data rate service, low rate data, compatibility with analog (North America), roaming incentive (Europe), somewhat regular cell deployment
- 3G—variable data rate services, higher peak data rates (2 Mbps and higher), somewhat regular cell deployment.
- 4G proposed here—autonomous deployment, sleeper base stations, sleeping pilot signals, the cellular network grows organically, highly irregular cell deployment, "smart network architecture", all the network smarts are contained in one of the network control servers, the Controller in a given network control domain. The physical layer plug-and-auto-optimize base station.

Modes of Deployment

The proposed autonomous cellular network offers new possibilities for deployment of the base stations. In order for the infrastructure deployment to be responsive to coverage needs, or to the emergence of new hot spots, it is beneficial to allow the deployment to be performed by different individuals or enterprises in an organic manner. Base station equipment can be deployed using the same model as the deployment of terminals, where different base stations are privately owned. With the above model of private, non-operating company, ownership of the cellular access points, or at least the small cellular access points, there is still the need for an operator to operate the Controller (20) if high spectral efficiency is required, and also to operate the large base stations (24) that will provide coverage over non-hot spot areas, or the remaining areas that are not covered by the organic deployment of small cellular access points. The operating company will also manage the spectrum that it currently licenses. This management is preferably realized through the operation of an algorithm that optimizes the power levels of the different cellular access points that connect to a single Controller (20). The operating company also provides many access services such as the secure login to the network in a mobile environment. This may be achieved with a point to point encryption of the transmission on the wireless link or an of end-end tunneling protocol operating between the mobile terminal and a network security server as is the case in a virtual private network.

The traffic carried by small cellular access points can be that of the small cellular access point owner or third party traffic, where in one particular aspect of the present invention the installer of the base station (large or small) is credited by the operator of the backbone network for carrying such third party traffic. The cellular access point would have a configuration parameter that would determine the degree to which it is willing to carry third party traffic.

From the standpoint of a terminal (16) and the billing for network access three main modes of operation are contemplated (but others are possible). In mode I the terminal (16) accesses a large base station (12) installed by the cellular operating company in a manner that is similar to that in the current cellular system—we refer to it as the wide-area mode. This type of connectivity is the default mode and exists anywhere that there is coverage by a cellular company. This coverage is only limited by the coverage that can be provided by the cellular company. In most countries in Europe this coverage would practically include the whole country with a small percentage of the total area of the country being the exception. In mode II the terminal (16) belongs to the owner of a small cellular access point (26). The prime example here is that in a home where a small cellular access point (26) is installed to offer wireless voice and data services in a manner where the operation is seamless with the wide area network (mode I). In this mode we would expect that air time is free but that the mobile user is a subscriber to the operator of the backbone network and is using its services. In this mode the small cellular access point would be similar to a current WiFi access point that is installed in the home, but with the added benefit that the small cellular access point (26) would handle both voice and data traffic and that the terminal (16) would be the same terminal with the same air interface for the whole cellular network. We may also refer to mode II as the home hot-spot mode. Mode III of operation involves the terminal in a non-home hot-spot area. We may also refer to it as the roaming hot-spot mode. In this mode the behaviour of the terminal (16) in terms of handoffs, power levels, and bit rate capability (we expect higher bit rates in smaller cells) is similar to that of mode II but the billing may be different because the user is not the owner of the cellular access point.

The present invention therefore meets the objectives of 3G but in a manner that permits use of existing infrastructure to provide the advantages of what is (in 3G) proposed as a new infrastructure.

In terms of the air interface, the present invention provides a communication system, a communication network infrastructure and a method of deploying a communication network that maximizes the capacity per cell per MHz, handles inter-cell interference, and easily accommodates hand-offs. The technologies devised for the physical layer of 3G systems and their continuing evolutions to higher bit rates provide the base for the physical layer of the invention described, modified to handle large degrees of cell non-regularity and a large number of small cellular access points (26) that will in many cases be lightly loaded in terms of the number of users.

Autonomous Infrastructure GSM with Frequency Hopping

The GSM cellular standard is based on GMSK modulation (a generalized form of QPSK and slow-frequency hopping. This modulation scheme does not have the interference robustness characteristics of spread spectrum, or CDMA, and contrary to CDMA requires a frequency re-use cluster size that is generally greater than unity. However, the frequency hopping option does offer some robustness against interference that is generally referred to as interferer diversity. Frequency planning in a GSM network starts with the partion of a block of spectrum (e.g. 5 MHz, or 10 MHz) into a set of 200 KHz channels. These channels are then partitioned into sets and allocated to cells and sectors. A set allocated to a specific cell is known as that cell's cell allocation (CA). For example with 120 degree sectored antennas, a re-use pattern of 3/9 means a re-use pattern of 3 cells or 9 sectors. For each set of channels in a sector we then create a set of frequency hopping patterns. If there are N channels (200 KHz) then we can create N orthogonal frequency hopping patterns. In legacy GSM networks the frequency re-use cell clusters are typically arranged in a regular pattern and the cells generally have a constant size. However with the disclosed concept of autonomous deployment the access points or base stations will be deployed randomly throughout a service area and the cell sizes may have large variations. The selection of the frequency assignment channels at each sector would require the base station to monitor its environment, i.e. monitor all the available RF channels, and transmit these to the Controller. The Controller would then select a subset of these channels, a CA, to determine a frequency assignment for that particular cell/sector. The Controller would then send a set of configuration parameters to the base station to configure it as a typical base station from the standpoint of terminals that would move into its cell. These parameters would include the following:

the set of radio frequency channels used in the cell (CA), together with the identification of the broadcast channel (BCCH) carrier.
the TDMA frame number (FN)

The base station would then be commanded to go into either sleeping mode or beacon (broadcast channel) transmission mode. In With that frequency assignment selected a frequency hopping sequence would be generated and sent to the base station by the Controller.

The following summarizes the operation of a GSM based autonomous infrastructure cellular system in accordance with the present invention:

The base station (as described above) has the capability to receive signals on the low-band. This is the normal reception band (terminals transmit in the low frequency band in an FDD system).
The base station will have the added capability to receive signals on the high band. This capability is used to monitor transmissions from neighbouring base stations.
The base station reports a frequency block containing channels in the high band and low band that it has capability to monitor (i.e. RF band capability) to the Controller.
The Controller will take a subset of these bands that it is interested in, i.e. for which it is running a configuration algorithm, and command the base station to monitor these bands and provide interference (or received signal) information.
The base station scans all these bands and sends the information to the Controller. Stay in one frequency for a hopping cycle, then move to another frequency. Report the measurements in terms of signal powers.
The Controller will use the channel measurements to decide on a hopping sequence for the newly installed access point.
For full duplex operation the down link transmission frequencies (in a hopping pattern) are offset from the uplink transmission frequencies by a constant separation. Hence the determination of the downlink hopping pattern automatically determines the uplink hopping pattern for the same link.
Sleeping broadcast channel: With many GSM small access points it is important not to have the broadcast and synch channels "ON" continuously as in the case of a legacy GSM system, as this would cause unnecessary interference from small access points that have zero load (no users). The modified system introduces a mechanism where the mobile terminal, after sensing the channel and not finding a system, transmits an access point awakening signal. This signal is transmitted on a well known system channel or channels. We refer to this signal as being transmitted in an ALARM channel. A particular system may operate with more than one ALARM channels. If more than one such channels exists then the mobile terminal can perform a transmit cycle through all of the ALARM channels in order to wake up the terminals.

Network Architecture

The autonomous infrastructure wireless network disclosed here requires an access type of network where base stations, or access points, can readily be attached, or plugged in, using a paradigm similar to the attachment of an electrical appliance to the power grid. Also, in keeping with the trend in communication networks, this network should be an IP (Internet Protocol) based type of network. There is a multiplicity of network architectures that may be utilized for this purpose. In the following we discuss some of these possibilities.

(a) Ethernet LAN

Figure 2A:
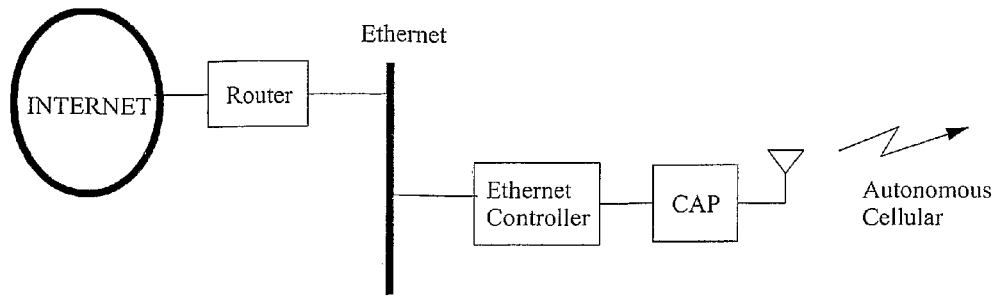
FIG. 2a illustrates the present invention in which the fixed access point is an Ethernet, or LAN connection, which fixed access point provides the connection for the Cellular Access Point or "CAP").

The prime example of an IP based base station interconnection network is a hard-wired Ethernet LAN. The base stations would contain an interface that connects directly to the LAN, or they could connect using a network interface card as an added module. Each base station would automatically configure an IP address for the LAN and at the same time initiate communication with the Controller. The plugging in of the base station would result in two phases of auto-configuration. In the first phase there would be a configuration for communication in the interconnection network including the auto-configuring of an IP address and the acquisition of the IP address for the autonomous network Controller. With such communication established, the base station will begin the second phase of configuration—the configuration of the autonomous cellular air interface, or wireless access, parameters. The means of connecting the cellular access point (CAP) to the network is depicted in FIG. 2 *a*). This figure does not show the Controller which is a node in the network that is included in the block labelled as "Internet".

b) Public Switched Telephone Network

Figure 2B:
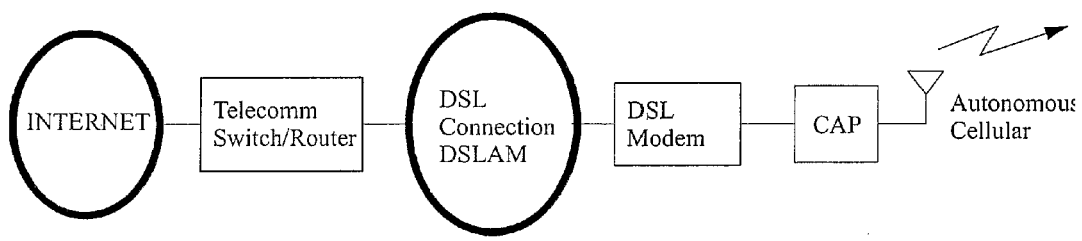
FIG. 2b illustrates the present invention in which the fixed access point is a DSL home or small business connection.

The second example is that of a public switched telephone network (PSTN). The simplest example here is that of a DSL (digital subscriber line) connection to a home or small business. This DSL line can be one of a number of evolving DSL technologies, e.g. ADSL, VDSL, xDSL, or other. With this option we can easily create wireless home networks, or small interprise networks that are compatible at the wireless physical layer with regular cellular networks (compatibility aspect of autonomous cellular). These networks will have an advantage over existing WiFi networks in terms of security and interference management in areas with a high density of wireless devices. With this type of network the base station may be customer owned or owned by the operating company—i.e. the company that operates the autonomous network Controller. The method of connection of the CAP to the network is shown in FIG. 2*b*).

Figure 2C:
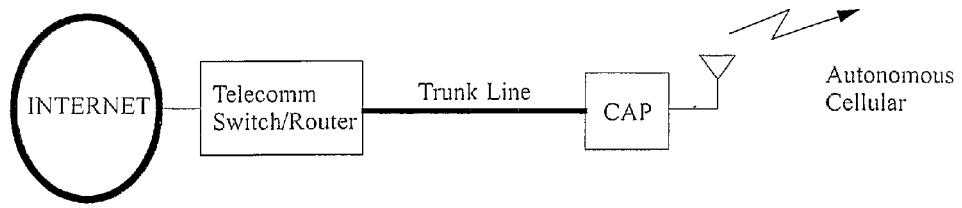
FIG. 2c illustrates the present invention in which the fixed access point is a telephone network connection (cellular micro-cell architecture).

Another alternative to this type of network is a network where the base station (CAP) is placed closed to a home but serves a multiplicity of homes. The connection method is shown in FIG. 2*c*). The base station would likely be connected over fibre to a switch or router in the PSTN. The number of homes served by one base station (CAP) would depend on the capacity required at each home and the amount of radio spectrum available. For example, if we intend to provide services such as IP-TV to the home then a large capacity per home is required and each base station will have to be located at such a distance from the home that it serves a small number of homes depending on the over-all bandwidth available. This alternative is attractive in comparison to state of the art proposals for IP-TV involving hardwired connections to the home, in that it provides for the portability of terminals in a home environment and at the same time reduces the wiring costs—i.e. the costs of running wire to each home.

c) Community Access Television Network (CATV)

Figure 3A:
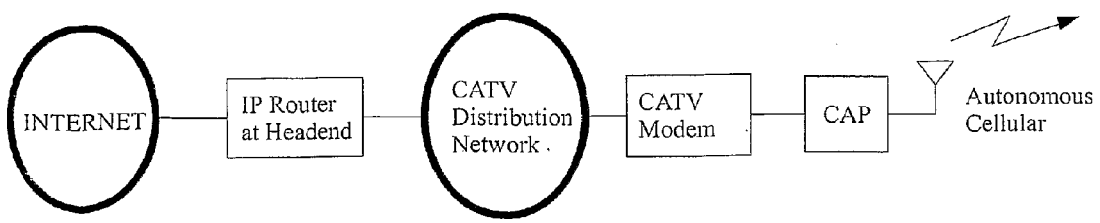
FIG. 3a illustrates the operation of the present invention in conjunction with a Community Access TV (CATV) network. This Figure illustrates the placement of the CAP: i) in the home or office (private), or at a tap-box or further-back in the cable distribution plant (shared). The further back the CAP is placed, the higher is the required transmitter power.

A CATV network is a logical network alternative for the interconnection of base stations. It has a high capacity and wide coverage (deployment) in residential areas. As for the PSTN option discussed above there are two possibilities here. In the first case we may install a base station (CAP) in a home. This base station would replace an existing cable modem (currently used for Internet access). One interface of the base station would consist of a cable modem with the capability to possibly tune into one of a number of cable channels (6 MHz in North America). The other interface would be the autonomous wireless interface that provides wireless access within a home environment and its vicinity and is compatible with a wide area cellular network. This method of connection is shown in FIG. 3*a*).

The second approach would be to have the base station (CAP) placed outside the home and at a given distance from the home. The exact distance would depend on the capacity of the wireless interface required. Using a large distance requires greater transmission power and results in a greater number of homes served by the base station. The base station could replace an existing tap-box in the cable distribution network which typically feeds 8 homes, or it could be placed further back in the cable distribution plant at a node that serves several hundred homes. The choice of location on the cable distribution network depends on the RF spectrum available and the services being provided to the home—i.e. the ultimate capacity requirement per home. The greater the capacity requirement the smaller is the cell size and the closer to the home is the CAP.

d) Power Line Communications Network (PLC)

Figure 3B:
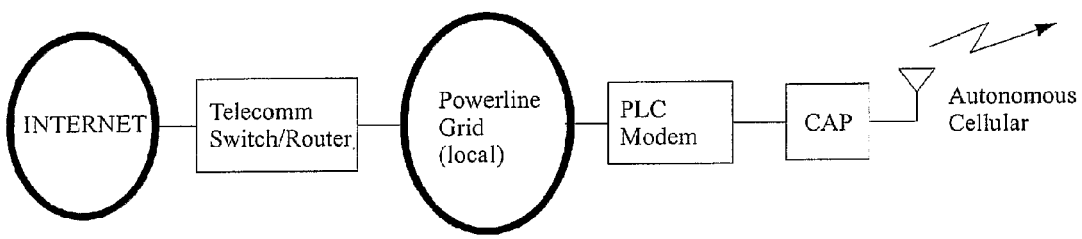
FIG. 3b illustrates the present invention in which the fixed access point is provide by a Power Line Communications (PLC) or Broadband over power lines (BPL).

Another alternative for the interconnection of base stations would be a power line communication (PLC) network or, also referred to as a broadband power line communication network (BPL). The overall network would consist of a backbone network (e.g. backbone of telephone network) with nodes being points of connection to a power line. Each such node would connect to a branch of the power grid serving a limited area. Then, for each such branch a multiplicity of base stations (CAPs) could be connected. The method of connection is shown in FIG. 3*b*). Each base station would, again, have two interfaces. One interface consists of a modem for power line communications using the particular modulation for that system—e.g. some form of OFDM. The other interface would be the wireless access interface for the autonomous cellular network. The size of each of the above branches of the power line grid and the allowed number of connections of base stations to a branch would depend on the capacity required for each base station and the capacity provided by the PLC scheme. The traffic handling capacity of all the base stations in one branch would have to be smaller than the capacity of the PLC scheme. If the we wish to increase the number of base stations in one branch in such a manner that the above capacity constraint is violated then the solution would be to split the branch into two smaller branches by adding extra nodes in the backbone network. This type of network has the advantage that the wiring is already in place due to its primary function in power distribution. Also, such a network would provide good coverage in in-door environments, malls, underground levels, etc.

e) Fixed Wireless Access Network

Figure 3C:
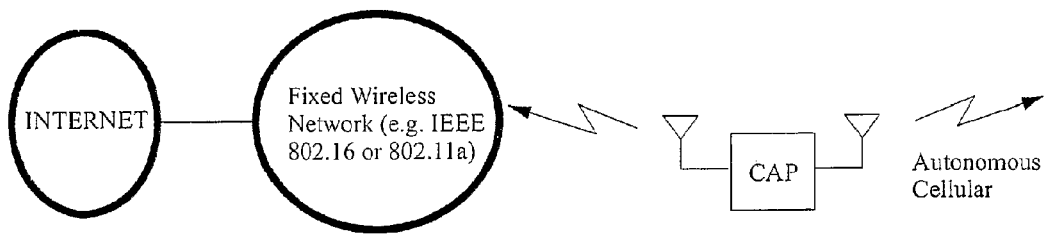

The base stations (CAP) may be interconnected by a fixed wireless access network such as a mesh network based on the IEEE 802.16 air interface (WiMax), or a wireless LAN based on the IEEE802.11a protocol as shown in FIG. 3*c*) Each node in the mesh network would be a base station in the autonomous cellular network. Each base station would have two radio interfaces. One interface would connect to the mesh network. The second interface would provide wireless access to mobile and portable terminals over the autonomous cellular network. The mesh wireless network should be designed in such a manner that new nodes (CAP's) are easily deployed so as to allow for the organic growth of network in the spirit of the autonomous infrastructure wireless system concept.

Terminal Considerations

In a typical state of the art cellular network (legacy cellular system), base stations transmit a signal either continuously or periodically (e.g. one slot per frame) whose purpose it is to "announce" the presence of a base station to terminals that move into the cell served by such a base station. These signals (channels) may be called broadcast channel, synchronization channel, beacon channel or signal, pilot channel or signal, or other. An essential concept in the disclosed invention is that of a sleeping base station.

If a certain cell has no users then we don't want the above signals (channels) to be necessarily transmitted because we may have a very high density of base stations with no users and this would cause unnecessary interference. The classical example here is the pilot signal in a CDMA system, where the resulting interference is sometimes called "pilot polution". A base station with the above-referenced signal turned OFF is said to be in sleep mode. Now, in a legacy cellular system when a terminal is powered ON then it immediately attempts to synchronize to the above mentioned synchronization signal, pilot signal, or beacon signal. If the base station is in sleep mode then the terminal must have a mechanism to awaken the base station. Hence a terminal in an autonomous cellular network should have the enhanced capability (over terminals for legacy cellular systems) to transmit a signal that we refer to here as an ALARM signal (synonymous with a wake-up alarm). The terminal, upon being powered up will first search for local cells that are awake, in the normal operation mode of such a terminal in a legacy cellular system, and if no such cell is found it will transmit the ALARM signal for a given period of time. Afterwards it again searches for the presence of base stations. It will repeat this cycle of transmitting the ALARM signal and listening for a certain number of times, at which point, if still there are no base stations present, it will assume that it is not within range of an autonomous infrastructure wireless network and turn OFF.

Services

The autonomous infrastructure cellular network of the present invention is envisioned as a $4^{th}$ generation wireless network. The three main telecommunication services of today are voice, video distribution, and Internet access. Traditionally these services have been provided by three distinct network architectures: telephone network, CATV network, and the Internet. The trend is for all of these architectures to converge to a single architecture that provides the three services—the so-called triple play. A key requirement for the provision of triple play is sufficient capacity in the access network. Another trend in the industry is for the use of wireless in the access part of the network. Wireless provides portability and reduces wiring costs. A third requirement is the reduction of the cost of installation. The autonomous infrastructure wireless network concept disclosed here is an ideal technology to meet these goals. The network can be designed to be IP based and to provide voice over IP service VoIP, television over IP service (IP-TV), and regular multimedia Internet access. In the case of IP-TV there are different emerging standards depending on the size of the terminal or display device. Services with smaller terminals currently being developed for cellular transmission can be adopted in the autonomous cellular network in the same manner as currently being planned for mobile cellular networks. However, due to the possibility for much smaller cells the autonomous cellular system can also be used for the distribution of video signals to the home using IP-TV.

Radio Spectrum

There is currently great interest in finding new uses for previously allocated spectrum for TV broadcasting. These TV UHF bands below 1 GHz are rarely used. On the other hand regulatory requirements require that these channels be available if required for use by a transmitter according to the old spectrum allocation license. The solution being discussed is to design radios that automatically detect if a particular band is being used and to vacate the band if it starts being used. The autonomous infrastructure network concept is ideal for this spectrum usage requirement and is a candidate architecture for the use in the future allocation.

What is claimed is:

1. A method of deploying a cellular wireless communication network characterized by
    (a) providing to one or more customers and at least one host entity one or more cellular wireless micro base stations, said customers including any of the following, individuals and businesses, and the at least one host entity including, at least one network operating company;
    (b) autonomously configuring the deployment of the one or more cellular wireless micro base stations based on a configuration network controller, said autonomous configuring being achievable individually by each of the one or more customer and the at least one host entity by autonomously deploying the one or more wireless micro base stations by connecting the one or more cellular wireless micro base stations to at least one network access point linked to a fixed network, thereby enabling the configuration of the one or more cellular wireless micro base stations to cooperate with the network controller associated with the cellular wireless communication network and also linked to the fixed network, the network controller being operable to send one or more network operation commands to the one or more cellular wireless micro base stations that define one or more physical layer parameters; and
    (c) executing the network operation commands on the one or more cellular wireless micro base stations thereby providing network connectivity in a cellular zone defined by the one or more cellular wireless micro base stations; and
    whereby autonomous growth and organic growth of the cellular wireless communication network is achievable by the one or more customers and the at least one host entity.

2. The method claimed in claim 1, characterized by the one or more cellular wireless micro base stations cooperating with other base stations, including one or more other micro base stations and one or more other large network base stations, to provide network connectivity to one or more cellular wireless communication terminals associated with individuals or businesses subscribing to the cellular wireless communication network.

3. The method claimed in claim 1, characterized by the one or more cellular wireless micro base stations utilizing a physical layer based on spread spectrum techniques with universal frequency re-use, said frequency re-use cluster size being equal to 1, and the network controller automatically configuring the one or more wireless base stations with a one or more of the following physical layer parameters:
    (a) a predetermined pilot signal power level;
    (b) pilot signal parameters;
    (c) adaptive antenna array pointing parameters; and (d) one or more activity states for the one or more cellular wireless micro base stations, each activity state being associated with parameters established by the network controller, including the requirements for a change from one activity state to another.

4. The method of claim 1, characterized by the one or more cellular wireless micro base stations being operable to carry third party traffic between one or more cellular wireless communication terminals not associated with the one or more cellular wireless micro base stations and the cellular wireless communication network via the fixed network, and the operation of the cellular wireless communication network providing a benefit to a host entity of the one or more cellular wireless micro base stations in exchange for the carriage of such third panty traffic.

5. A wireless communication network deployable individually and autonomously by each of: one or more customers; and at least one host entity, characterized in that the wireless communication network includes:
   a cellular micro base station that:
   (i) is configurable to link to a fixed network via a high data transmission connection so as to define at least one access point between the micro base station and the fixed network;
   (ii) includes a wireless interface; and
   (iii) is operable to receive operation commands from a network controller associated with at least one cellular wireless communication network and being linked to the fixed network so as to configure the micro base station to support network connectivity between one or more cellular wireless communication terminals via the wireless interface by operation of the micro base station, as an intermediary, the operation commands being based on one or more physical layer parameters defined by the network controller;
   (iv) the network controller is operable to provide operation commands based on a modulation scheme providing parameters for spread spectrum and resistance to interference, and the micro base station is operable to execute operation commands corresponding to such parameters and thereby implementing the modulation scheme; and
   (iv) is operable to install the at least one access point in an autonomous manner.

6. The wireless communication network of claim 5, characterized in that the at least one access point is connected to the high data transmission network to provide data connectivity to one or more computers linked to the micro base station.

7. The wireless communication network claimed in claim 5, characterized in that the micro base station configures automatically to connect to the fixed network and to the network controller.

8. The wireless communication network claimed in claim 5, characterized in that the micro base station is interoperable, based on operation commands from the network controller, with one or more other base stations including one or more other micro base stations or large network base stations, to provide connectivity to one or more cellular wireless communication terminals to the fixed network, as determined by the network controller.

9. The wireless communication network claimed in claim 5, characterized in that the wireless interface consists of a single unified air interface that is operable in a wide-area mode and a high bit rate or "hot-spot" mode, said wireless interface being configurable by the network controller to establish parameters of the operation of the micro base station in accordance with said wide area mode and/or said "hot-spot" mode.

10. The wireless communication network claimed claim 5, characterized in that the micro base station is operable to connect to the network controller by:
   (a) connecting by operation of a wired interface via the fixed network to the network controller; or
   (b) connecting to a cellular base station linked to the network controller via a point-to-point wireless link established by the wireless interface.

11. The wireless communication network claimed in claim 5, characterized in that the micro base station is operable to automatically: (a) install the at least one access point as a fixed network access point between the micro base station and the fixed network, (b) install the at least one access point as a cellular access point for one or more cellular wireless communication terminals to access the fixed network as determined by the network controller, and (c) connect to the network controller.

12. The wireless communication network as claimed in claim 5, characterized in that the network controller manages the interoperation between the micro base station and one or more other linked base stations, the one or more other linked base stations including one or more other micro based stations.

13. The wireless communication network as claimed in claim 5, characterized in that the micro base station is operable to measure a signal strength of one or more pilots corresponding to access points within a defined vicinity of the micro base station, and transmit such measurements to the network controller.

14. The wireless communication network as claimed in claim 13, characterized in that the micro base station is operable to execute operation commands for establishing a pilot transmission power setting for the micro base station based on an optimization routine initiated by the network controller.

15. The wireless communication network as claimed in claim 5, characterized in that the micro base station is operable to execute operation commands for determining one or more activity states for the micro base station, each activity state being associated with parameters established by the network controller, including the requirements for a change from one activity state to another.

16. The wireless communication network as claimed in claim 15, characterized in that an activity state of "sleep mode" is assigned to the micro base station and applied at the micro base station to reduce pilot interference, based on parameters established by the network controller.

17. The wireless communication network as claimed in claim 5, characterized in that the micro base station is operable to connect to a high data transmission network consisting of one or more of the following: (a) a Local Area Network, (b) a Wide Area Network, (c) a DSL access network, (d) a cable TV access network, or (a) a power line transmission communication network.

18. The wireless communication network as claimed in claim 5, characterized in that the micro base station includes a physical layer based on spread spectrum techniques with universal frequency re-use (frequency re-use cluster size equal to 1) and the network controller automatically configures the micro base stations with a predetermined pilot signal power level, pilot signal parameters, and adaptive antenna array pointing parameters.

19. A computer program product having a non-transitory computer readable medium having computer program logic recorded thereon for establishing on a server linked to a cellular wireless communication network for managing the interoperation of a plurality of base stations, and being deployable individually and autonomously by each of; one or more customers; and at least one host entity, the base stations including at least one micro base station, characterized in that the non-transitory computer program includes:
  (a) a control module that is operable to transmit one or more operation commands that are executable by the micro base stations to execute the following instructions:
    (i) provide network connectivity in a cellular zone defined by the micro base station to a fixed network to one or more cellular wireless communication terminals, as determined by a network controller associated with the cellular wireless communication network;
    (ii) cooperate based on physical layer parameters defined by the network controller with other base stations, including other micro base stations and large network base stations, to provide network connectivity to one or more cellular wireless communication terminals associated with the cellular wireless communication network;
    (iii) configuring the micro base stations with a predetermined pilot signal power level, pilot signal parameters, adaptive antenna array pointing parameters, and/or one or more activity states for the micro base station, each activity state being associated with parameters established by the network controller, including the requirements for a change from one activity state to another;
    (iv) configuring one or more autonomous micro base stations to define at least one access point in a connection to the network controller in an autonomous manner; and
    (v) configuring the micro base stations based on a modulation scheme with at least one of the following modulation parameters: one or more spread spectrum parameters; and one or more resistance to interference parameters, and the micro base station being operable to execute said operation commands corresponding to said modulation parameters to implement the modulation scheme.

20. A system for controlling a cellular wireless communication network deployable individually and autonomously by each of: one or more customers and at least one host entity, characterized in that the system includes:
  (a) a server linked to a control program, the server and control program defining a network controller; and
  (b) the network controller being linked to a cellular wireless communication network that includes a plurality a base stations for defining a plurality of cellular zones that support the wireless connection of cellular wireless communication, terminals to the cellular wireless communication network, the base stations including one or more micro base stations that are automatically configurable to connect to the network controller via a high data transmission connection so as to define at least one access point between the micro base station and the network controller, the automatically configurable one or more micro base stations being operable to install the at least one access point in an autonomous manner, the network controller including a control module that is operable to transmit one or more operation commands based on physical layer parameters that are executable by the micro base stations to execute the following instructions:
    (i) provide network connectivity in a cellular zone defined by the micro base station to one or more cellular wireless communication terminals associated with the cellular wireless communication network via a fixed network;
    (ii) co-operate based on parameters defined by the network controller with other base stations, including other micro base stations and large network base stations, to provide network connectivity to one or more cellular wireless communication terminals associated with the cellular wireless communication network;
    (iii) configuring the micro base stations with a predetermined pilot signal power level, pilot signal parameters, adaptive antenna array pointing parameters, and/or one or more activity states for the micro base station, each activity state being associated with parameters established by the network controller, including the requirements for a change from one activity state to another; and
    (iv) configuring the micro base stations based on a modulation scheme with at least one of the following modulation parameters: one or more spread spectrum parameters; and one or more resistance to interference parameters, and the micro be station being operable to execute said operation commands corresponding to said modulation parameters to implement the modulation scheme.

* * * * *